Nov. 10, 1942.　　　　L. P. PITRE　　　　2,301,791
CALCINING APPARATUS
Filed May 25, 1940　　　　2 Sheets-Sheet 1

INVENTOR.
Laurence P. Pitre
BY
ATTORNEYS.

Nov. 10, 1942.  L. P. PITRE  2,301,791
CALCINING APPARATUS
Filed May 25, 1940  2 Sheets-Sheet 2

INVENTOR.
Laurence P. Pitre
BY
ATTORNEYS.

Patented Nov. 10, 1942

2,301,791

UNITED STATES PATENT OFFICE 2,301,791

CALCINING APPARATUS

Laurence P. Pitre, Houma, La.

Application May 25, 1940, Serial No. 337,255

7 Claims. (Cl. 263—6)

This invention relates to apparatus for the thermal treatment of raw material and more particularly to apparatus which may be employed in the calcining of oyster shells and the like.

In the production of lime from oyster shells, considerable variation in quality has been experienced due to incomplete and uneven oxidation and, in addition, the heat necessary for satisfactory calcination, where a conveyor system has been employed, often quickly damages the latter.

The principal object of this invention is to provide an apparatus which will effect uniform calcination of the material and which will substantially eliminate overheating of the conveyor system.

Another important object is to provide an apparatus for processing oyster shells and similar material, whereby foreign matter will be thoroughly removed during calcination.

Yet another important object is to provide a conveyor system adapted to an oyster shell calcining apparatus, wherein the conveyors continuously turn over the shells, thus exposing both the inner and outer faces to the heat and, altho the shells are thus turned, the specific action of the conveyor system is such that they emerge intact from the apparatus but, upon exposure to the air and moisture, crumble to a fine powder.

Another object is to provide such an apparatus, which is free of interior obstructions which would tend to clog the apparatus or retard the movement of the shells.

Still another object is to provide such an apparatus, with a roller conveyor system, which is so constructed that the spacing between the rollers may be varied and the rollers may be easily removed and replaced.

Other objects and advantages of the invention will be apparent during the course of the following detailed description of the invention, taken in connection with the accompanying drawings, forming a part of this specification and in which drawings.

Figure 2:
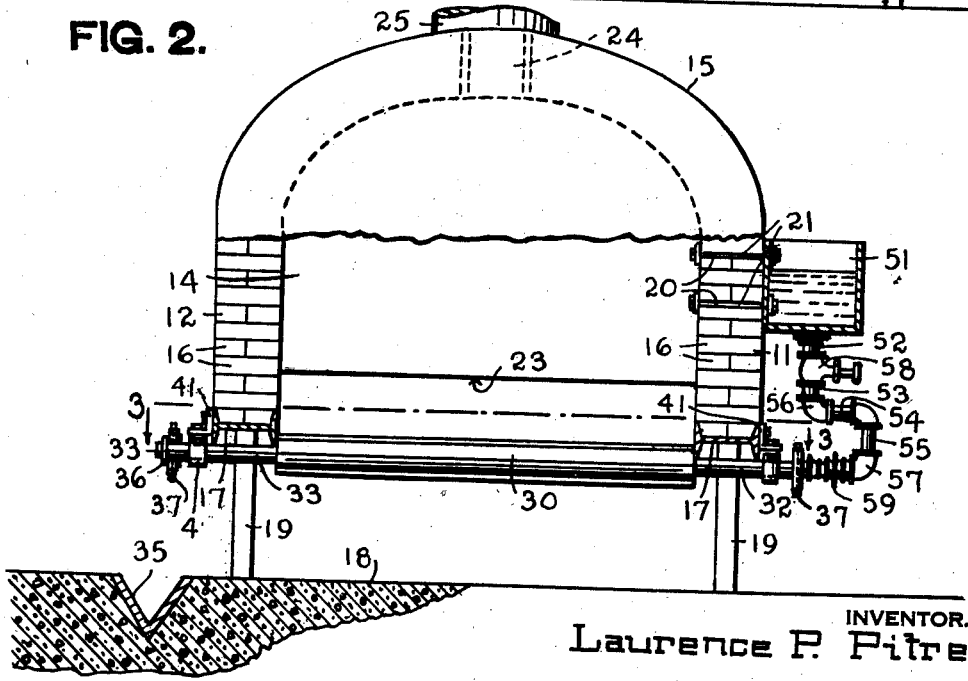
Figure 2 is a view, partly in end (intake end) elevation and partly in vertical section, substantially on the line 2—2 of Figure 1.

In the drawings, wherein for the purpose of illustration is shown a preferred form and a modified form of the invention, and wherein similar reference characters designate corresponding parts thruout the several views, the preferred embodiment of the invention comprises a housing or kiln 10, which may comprise opposite side walls 11 and 12 and opposite end walls 13 and 14 joining the side walls, and a top wall or roof portion 15 which may arch upwardly from the side walls 11 and 12, as in Figure 2. These walls may be of fire brick 16 and may be supported in any approved way, as by horizontally-disposed I-beams 17.

An important feature of the invention is that the kiln is bottomless and is raised well above a suitable supporting surface, as the floor 18, by spaced apart legs or supports 19, which are suitably secured at their upper ends to the walls of the kiln.

Preferably, the side walls are imperforate, except for such horizontal bores 20 as may be necessary to snugly accommodate bolt shanks 21 or the like adapted to support structure to be later described. Additionally, the I-beams may be drilled to accommodate bolt shanks which carry or support other portions of the structure to be described.

One end wall 13 may be provided with a suitable opening to the interior of the kiln and extended about the mouth of an inclined chute 22 adapted to discharge material, such as shells, into the kiln 10. The opposite end wall 14 may be provided with a suitable discharge opening 23 leading to the exterior of the kiln 10, so that the calcined material may be discharged therefrom. The roof portion or top wall 15 may have means to introduce a suitable oxidation-promoting medium into said kiln 10, and this means may be a plurality of spaced apart inlets 24, preferably inclined toward the end wall 13. Thru these inlets 24 flame or heat may be introduced into the kiln. Of course, without invention these inlets 24 may be disposed in the walls other than at the highest part of the roof portion 15, just so they are disposed a suitable distance above the horizontal plane of the conveyor. Extending from the roof portion 15 may be a suitable means to carry off the spent products of combustion and products of oxidation. This is illustrated as a smokestack 25.

A novel conveyor means is provided, being both novel in construction and in position with respect to the kiln 10. This means includes a plurality of rollers 30, arranged in a row, with their axes paralleling each other, disposed substantially horizontally, and extending transversely of the kiln, i. e., from side wall to side wall.

The body portion of each roller 30 is hollow or provided with a longitudinal passageway 31 and, extending from one end of each roller, is a suitable hollow spindle 32 and, extending from the opposite end, is a suitable hollow spindle 33 with the internal diameters of the bores 34 therethrough less than the diameter of the passageway 31. Through the open outer ends of the spindles 32 a cooling medium may enter the bore 34, flow therethrough, enter the passageway 31, flow therethrough and flow out through the bore 34 of the opposite spindle 33 and discharge from its free end. To accommodate the discharge therefrom, a suitable trough 35 may be positioned in the floor 18 as in Figures 2 and 3. The discharge spindle 33 may be provided with a collar or guard 36 spaced inwardly of its free end, so that the discharging cooling medium (which may be water) will not flow along the periphery of the spindle and into the spindle bearing.

Figure 3:
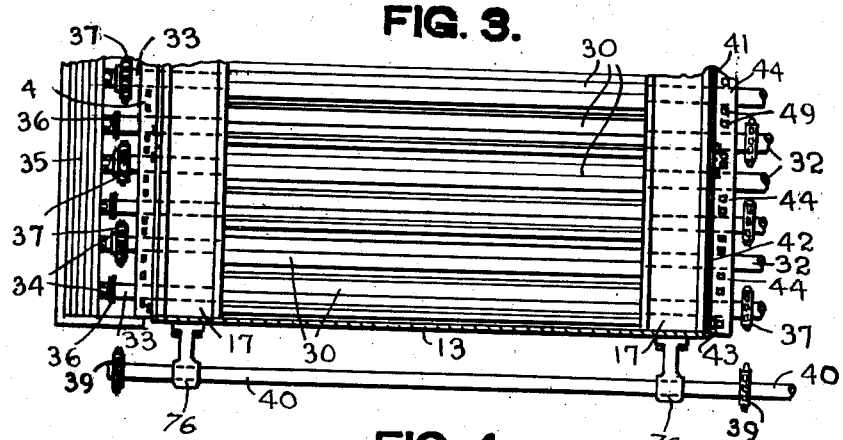
Figure 3 is a horizontal section, substantially on the line 3—3 of Figure 2.

Preferably, each alternate spindle 32 in the row of rollers 30, is provided with a sprocket 37 and each alternate spindle 33 in the row of rollers 30, is provided with a like sprocket, so that each roller carries one sprocket, as shown in Figure 3.

Figure 1:
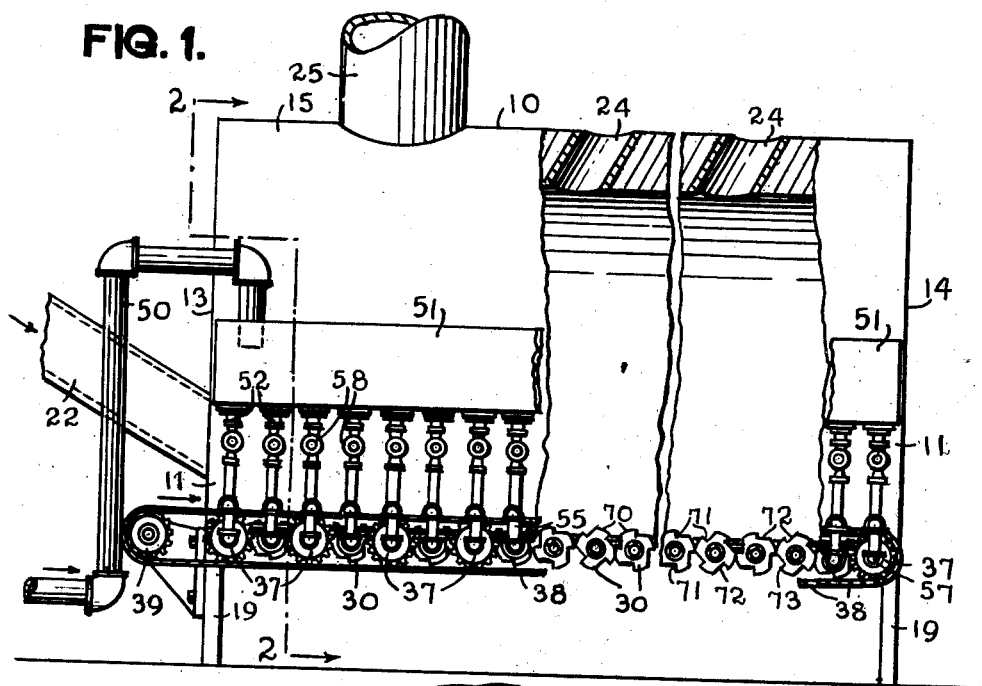
Figure 1 is a view, partly in side elevation and partly in vertical section, of the novel apparatus.

In addition to the sprockets 37, means to rotate the rollers 30, all in one direction, i. e., in a clockwise direction, as viewed in Figure 1, includes suitable chains 38 operatively associated with the sprockets 37 and with a pair of sprockets 39 attached to opposite ends of drive shaft 40, which drive shaft is supported by bearings 76 and may be rotated in any preferred manner, as by a belt and motor (not shown).

Means is provided for supporting the rollers 30, and includes, preferably, a plurality of angle iron sections 41, with the vertical portion 42 of each angle iron having bores accommodating the shanks of bolts 43 extending through the angle iron sections 41 and into the I-beams 17. These angle iron sections 42 extend outwardly of the kiln 10 at both side walls 11 and 12, and the horizontal portion 44 of each angle iron section may be provided with pairs of spaced apart slots 45 for a purpose next described. Bearings for the spindles 32 and 33 may be depending members 46, having suitable bores 47 for the spindles, and perforations accommodating bolt shanks 49 extending therethrough and into the slots 44. By this construction, means to vary the distance the rollers 30 may be spaced apart, is provided. This is an important feature of the invention. Of course, without invention the slots 45 might be in the members 46 and the perforations in the angle iron sections 41. By either arrangement, the rollers may be varied in spacing apart and may be easily removed for replacement and the like, as is now apparent.

It will be noted, particularly in Figures 1 and 2, that the rollers 30 are so disposed that they are below the inlets 24, are well above the floor or supporting surface 18 and are adjacent the open bottom of the kiln 10. In fact, as may be seen in Figure 4, taken with the foregoing description, at least one-half of their peripheral surfaces extend below the walls of the kiln 10 and as in Figure 4, substantially one-half of their peripheral surfaces are exposed to the atmosphere below the kiln at all times. While the rollers 30 extend across the lower end of the kiln 10, they are not so closely arranged that air cannot flow upwardly between the rollers and neither are they so closely spaced that foreign matter, as sand and the like, cannot drop from between the rollers 30. A portion of the oxygen in the air, flowing upwardly between the rollers, oxidizes, in the presence of the heat, the calcium carbonate in the material being calcined, and forms lime and carbon dioxide.

Figure 6:
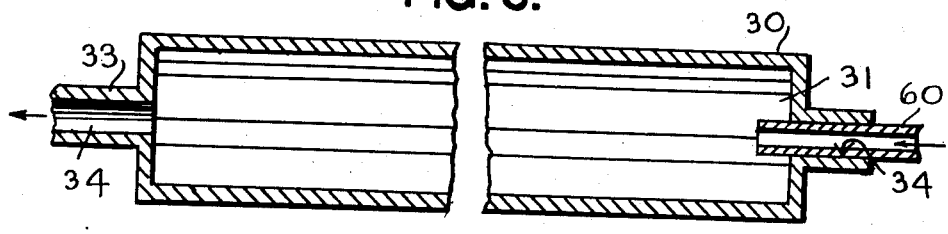
Figure 6 is a horizontal section of a modified roller.

Means is shown to supply a cooling medium to the rollers and, may comprise a suitable conduit 50 adapted to discharge the medium into an elevated tank or reservoir 51 supported by the kiln wall 11, through the medium of bolts, the shanks 21 of which extend through the bores 20 in the wall 11. Pipe sections 52, 53, 54 and 55, conduct the medium from the reservoir 51, to the bores 34 of the spindles 32. Suitable pipe couplings may be provided, as at 56 and 57 and elsewhere as needed, valves 58 interposed in the pipe line and a conventional flexible coupling 59 provided. In the event a non-pressure system is employed for the cooling medium, pipe sections 60 may be provided, suitably coupled to the pipe sections shown and extending through each of the bores 34 of the spindles 32 and terminating in the passageways 31 of the rollers 30. It will be noted in Figure 6 that by this arrangement, the inlet of cooling medium to the passageway 31 is higher than the outlet 34, so that there will be no back flow of the medium.

In the event a pressure system is employed, it is apparent that the pipe sections 60 may be dispensed with and there would be no open tank, but the connections would be obvious ones to conduct the cooling medium to the rollers without the loss of pressure.

Figure 4:
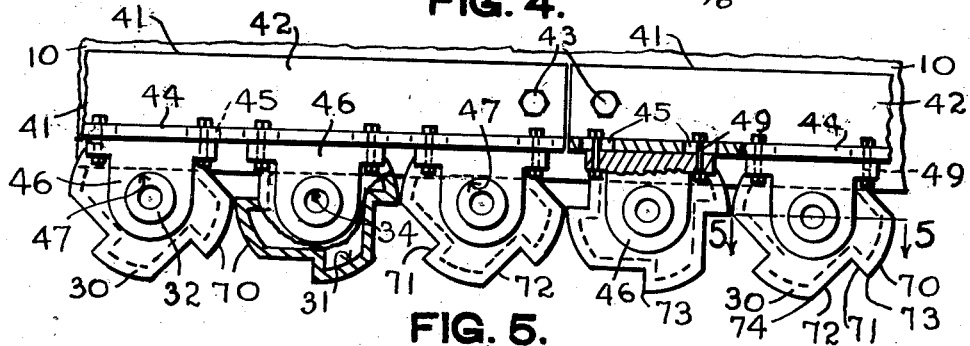
Figure 4 is an end elevation of a section of conveyor rollers and associated parts, of the novel apparatus.
Figure 5:
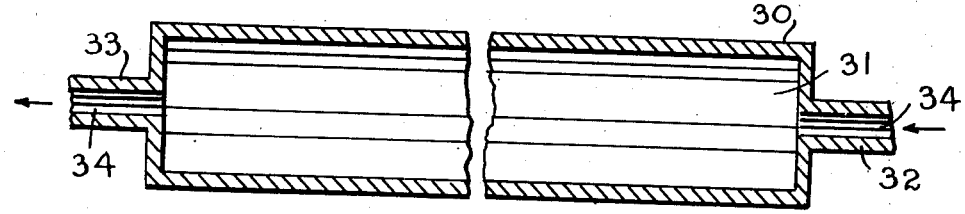
Figure 5 is a horizontal section of the rollers, substantially on the line 5—5 of Figure 4.

Now as to the novel roller construction shown particularly in Figure 4, each roller 30 is preferably alike and each roller is provided with a plurality of arcuate peripheral surfaces or faces 70, a plurality of substantially flat pusher surfaces or faces 71 extending in planes to the longitudinal axis of its roller and a plurality of substantially flat, relatively broad, faces or surfaces 72 with their planes paralleling the longitudinal axis of its roller. The surfaces or faces 71 are perpendicular to the surfaces or faces 72 and each face 71 extends from one edge 73 of a face 70 to a face 72, while each face 72 extends from the opposite paralleling edge 74 of a face 70 to form a juncture with a face 71. It will be noted that the longitudinally extending walls of the roller bodies are of substantially the same thickness and that the arcuate and flat faces 70, 71 and 72 have their counterparts within the chamber.

Attention is directed to Figure 4 where it will be seen that the disposition of one surface of one roller to one surface of the next adjacent roller is such that, as the rollers rotate, like arcuate surfaces 70, form V-pockets and that one relatively broad face 72 delivers the material from one roller 30 to the pusher face 71 of the next adjacent roller.

With this specific shape and disposition of the several faces or surfaces 70, 71 and 72 of the rollers 30, the material being subjected to the action of the heat and oxygen is not simply tumbled about, shaken up, nor does it travel in an unbroken flow along the conveyor. Instead, each section of the material is rolled over and over as it is carried along by the conveyor. Neither does the material pile up in thick layers along the conveyor surface but, instead, travels along in a stream of substantially the same depth thruout. By this rolling action, each section of the material (such as oyster shells) has all of its faces or surfaces exposed to the calcining action in an equal degree, and this insures an even calcination, with no portions over nor under calcined.

The rolling action is not violent and the material after calcination leaves the kiln with its form substantially intact, but will crumble to a fine powder when exposed to the air and moisture.

Foreign matter drops thru the spaces between the rollers 30 (which spacing may be varied as described).

Because of their surface contours and because of the cooling medium continuously flowing thru them, the rollers tend to remain many degrees cooler than solid cylindrical rollers. In addition, since substantially one-half of the total periphery of each roller is exposed at a given time to the relatively cool atmosphere below the kiln, this atmosphere tends to aid in cooling the rollers 30.

Material, such as shells, is introduced into the kiln from the chute 22 and deposited upon the conveyor rollers 30 which slowly roll it over and over, from end to end of the conveyor, while the air entering thru the spaces between the rollers 30 supplies the oxygen necessary for combustion and oxidation. The material emerges from the kiln thru the exit 23.

Various changes may be made to the forms of the invention herein shown and described without departing from the invention and scope of the claims.

I claim:

1. In means to roll irregularly-shaped calcinatory material thru a kiln with a substantially continuously rolling motion of said material, including a row of rollers with their axes of rotation substantially horizontal, and each roller being provided with a plurality of arcuate peripheral surfaces, a plurality of flat pusher surfaces with their planes substantially intersecting the axis of rotation of their roller, and a plurality of flat surfaces with their planes paralleling the axis of rotation of their roller said rollers being disposed so that, as they rotate, a flat surface of one roller will form an obtuse angle with a flat pusher surface of the next adjacent roller.

2. In means to roll irregularly-shaped calcinatory material thru a kiln with a substantially continuously rolling motion of said material, including a row of rollers with their axes of rotation substantially horizontal, and each roller being provided with a plurality of curved peripheral surfaces of substantial area, a plurality of flat surfaces each extending from one end of said curved surfaces and a plurality of flat surfaces normal to and joining said first-named flat surfaces and extending from the other end of each of said curved surfaces said rollers being disposed so that, as they rotate, a flat surface of one roller will form an obtuse angle with a flat pusher surface of the next adjacent roller.

3. In means to roll irregularly-shaped calcinatory material thru a kiln with a substantially continuously rolling motion of said material, including a row of rollers with their axes of rotation substantially horizontal, and each roller being provided with a plurality of curved peripheral surfaces of substantial area, a plurality of flat surfaces each extending from one end of said curved surfaces and a plurality of flat surfaces normal to and joining said first-named flat surfaces and extending from the other end of each of said curved surfaces, each of said first-named flat surfaces being of greater areas than said last-named flat surfaces said rollers being disposed so that, as they rotate, a flat surface of one roller will form an obtuse angle with a flat pusher surface of the next adjacent roller.

4. In a conveyor roller, a body portion having a plurality of peripheral faces, arcuate in transverse cross section of said body portion, a plurality of flat faces, one of each extending from one of each of said peripheral faces in a direction substantially paralleling the longitudinal axis of said body portion, and a plurality of flat faces, one of each extending from one of each of said peripheral faces to one of each of said second-named faces and in a direction normal to said second-named faces, all of said faces extending longitudinally of said body portion.

5. In a conveyor roller, a tubular body portion defining a chamber having a plurality of peripheral faces, arcuate in transverse cross section of said body portion, a plurality of flat faces, one of each extending from one of each of said peripheral faces in a direction substantially paralleling the longitudinal axis of said body portion, and a plurality of flat faces, one of each extending from one of each of said peripheral faces to one of each of said second-named faces and in a direction normal to said second-named faces, all of said faces extending longitudinally of said body portion, the longitudinally-extending walls of said body portion being of substantially the same thickness, and said tubular body portion having an opening at each end.

6. In a conveyor roller, a tubular body portion defining a chamber having a plurality of peripheral faces, arcuate in transverse cross section of said body portion, a plurality of flat faces, one of each extending from one of each of said peripheral faces in a direction substantially paralleling the longitudinal axis of said body portion, and a plurality of flat faces, one of each extending from one of each of said peripheral faces to one of each of said second-named faces and in a direction normal to said second-named faces, all of said faces extending longitudinally of said body portion, the longitudinally-extending walls of said body portion being of substantially the same thickness, and said tubular body portion having an opening at each end, said openings being of less diameter than the least diameter of said chamber.

7. In a calcining apparatus, a conveyor roller having a longitudinal passageway, spindles at opposite ends of said roller, provided with similar longitudinal bores communicating with said passageway and being of less diameter than said passageway, and means for introducing a liquid cooling medium into said passageway at one end thereof including a conduit extending into one of said bores, the other of said bores providing a discharge way for said medium whereby said discharge way is lower than the passageway through said conduit, when said roller is disposed substantially horizontal, and back flow of cooling medium is prevented.

LAURENCE P. PITRE.